(12) United States Patent
Amano et al.

(10) Patent No.: US 9,263,910 B2
(45) Date of Patent: Feb. 16, 2016

(54) WIRELESS CHARGING SYSTEM FOR MULTI-MODE DEVICE

(71) Applicant: LENOVO (SINGAPORE) PTE. LTD., Singapore (SG)

(72) Inventors: Masayuki Amano, Kanagawa-ken (JP); Yasumichi Tsukamoto, Kanagawa-ken (JP); Yoshio Nakamura, Kanagawa-ken (JP); Osamu Yamamoto, Kanagawa-ken (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 161 days.

(21) Appl. No.: 14/174,765

(22) Filed: Feb. 6, 2014

(65) Prior Publication Data
US 2015/0222138 A1 Aug. 6, 2015

(51) Int. Cl.
*H02J 7/02* (2006.01)
*H02J 7/00* (2006.01)

(52) U.S. Cl.
CPC ............... *H02J 7/025* (2013.01); *H02J 7/0044* (2013.01); *H02J 7/0052* (2013.01)

(58) Field of Classification Search
CPC ....... H02J 7/025; H02J 7/0044; H02J 7/0052; Y02B 40/90
USPC ......................................................... 320/108
See application file for complete search history.

(56) References Cited

U.S. PATENT DOCUMENTS

| | | | | |
|---|---|---|---|---|
| 6,577,234 B1* | 6/2003 | Dohrmann | ............. | G08B 13/00 340/540 |
| 7,352,567 B2* | 4/2008 | Hotelling | ............. | G06F 1/1632 312/223.2 |
| 7,684,150 B2* | 3/2010 | Pokhil | .................. | G11B 5/1272 360/125.57 |
| 7,906,936 B2* | 3/2011 | Azancot | .................... | G06F 1/26 320/108 |
| 7,916,467 B2* | 3/2011 | Hotelling | ............. | G06F 1/1632 320/108 |
| 8,193,769 B2* | 6/2012 | Azancot | .................... | G06F 1/26 320/108 |
| 8,397,982 B2* | 3/2013 | Slaby | .................... | G06F 1/1626 235/375 |
| 8,629,652 B2* | 1/2014 | Partovi | .................. | H02J 7/0027 320/108 |
| 8,712,324 B2* | 4/2014 | Corbridge | ............. | G06F 1/1632 455/41.1 |
| 8,754,609 B2* | 6/2014 | Tsai | ........................ | H02J 7/025 320/108 |
| 8,913,380 B2* | 12/2014 | Enomoto | ............. | G06F 1/1632 361/679.41 |
| 9,059,591 B2* | 6/2015 | Niec | ..................... | H02J 7/0044 |
| 2011/0164471 A1* | 7/2011 | Baarman | .................. | H02J 7/025 368/10 |
| 2011/0316353 A1 | 12/2011 | Ichikawa et al. | | |
| 2012/0161697 A1 | 6/2012 | Park et al. | | |
| 2013/0275642 A1 | 10/2013 | Teltz | | |
| 2014/0203661 A1* | 7/2014 | Dayan | ..................... | H01F 38/14 307/104 |

* cited by examiner

*Primary Examiner* — Sun Lin
(74) *Attorney, Agent, or Firm* — Shimokaji IP

(57) ABSTRACT

A wireless charging system provides charging to a multi-display device. A docking station in the system includes at least two transmission sources positioned so that a charger on the device is in range of at least one of the transmission sources when docked. In some embodiments, the docking station receives the device in a non-planar configuration and the charger receives charge on whichever side of the docking station it is docked on. In some embodiments, the system determines which side of the docking station is activated to provide charging. The multi-display device can be activated in a mode of operation associated with the side of the docking station determined to be providing charge.

20 Claims, 6 Drawing Sheets

US 9,263,910 B2

WIRELESS CHARGING SYSTEM FOR MULTI-MODE DEVICE

BACKGROUND OF THE INVENTION

The present invention generally relates to electronic accessories and, more particularly, to a wireless charging dock for a multi-mode capable device.

Some portable electronic device may include multiple displays. For example, some mobile phones, game systems, and computing devices use two displays in juxtaposition. Conventionally, these devices are re-charged via wired connection to an outlet.

Typically a charger on the device is plugged into a power source to recharge. In multi-display devices, the charger may be found on one side of the device due to space and cost considerations in designing the device. Thus, when re-charging the device, the device may be required to dock onto a charging station in one orientation.

As can be seen, there is a need for a charging system that allows charging of electronic devices in more than one orientation.

SUMMARY OF THE INVENTION

In one aspect of the present invention, a docking station for charging up a multi-display portable device comprises one or more docking surfaces configured to receive the multi-display portable device; a power source; and at least two transmission sources, coupled to the power source, and at least one of the two transmission sources is positioned to transmit electrical charge to a charger of the multi-display portable device as the multi-display portable device is docked on the docking station.

In another aspect of the present invention, a docking station for charging up a multi-display portable device comprises one or more docking surfaces configured to receive the multi-display portable device for docking; a power source; first and second transmission sources, coupled to the power source, and positioned to transmit electrical charge to a charger of the multi-display portable device as the multi-display portable device is docked on the docking station; and a circuit configured to detect whether the charger is in charging range of the first transmission source or the second transmission source.

In another aspect of the present invention, a wireless charging system comprises a multi-display portable device, including: a first device segment, a first display attached to the first device segment, a second device segment pivotally coupled to the first device segment, a second display attached to the second device segment, and a charger attached to the first device segment; and a docking station configured to receive the multi-display portable device for charging, including: one or more docking surfaces configured to receive the multi-display portable device for docking; a power source; first and second transmission sources, coupled to the power source, and positioned to transmit electrical charge to a charger of the multi-display portable device as the multi-display portable device is docked on the docking station.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a charging system for wirelessly charging portable electronic devices. In particular, the charging system may provide charging for devices that include multiple segments. The devices may thus be movable into various configurations. The charger on the device may be on one of multiple segments and exemplary embodiments of the present invention may charge the device as it is set on a docking station in one of multiple orientations.

Figure 1:
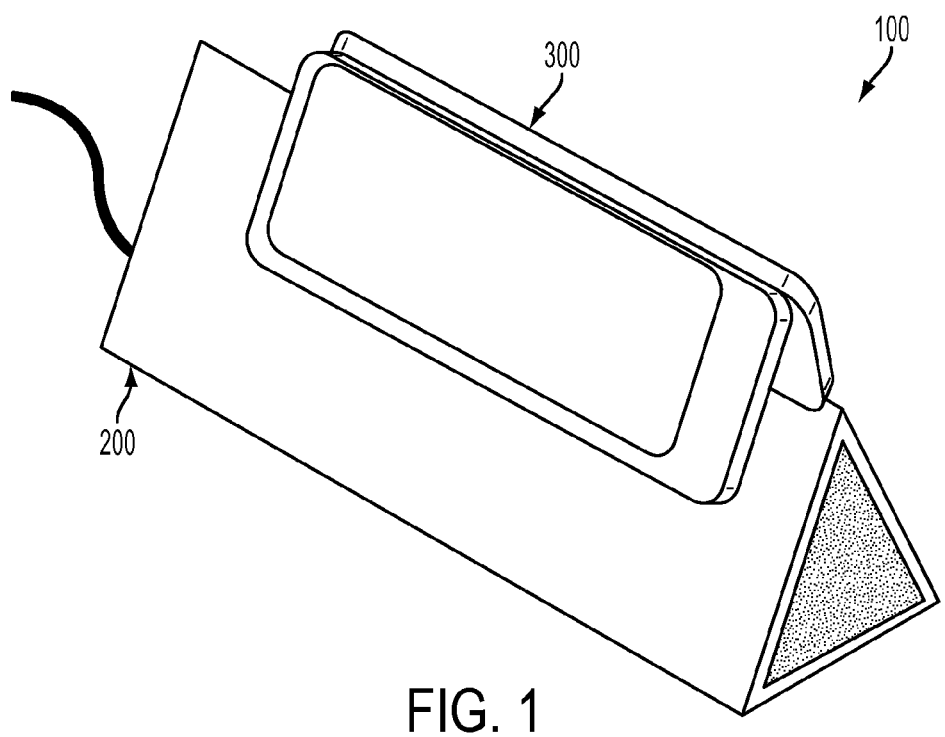
FIG. 1 is a front perspective view of a charging system according to an exemplary embodiment of the present invention.

Referring to FIG. 1, a wireless charging system 100 is shown according to an exemplary embodiment of the present invention. In general, the wireless charging system 100 may include a docking station 200 and a multi-display portable device 300. In an exemplary embodiment, the multi-display portable device 300 may be configured to dock onto the docking station 200 in a non-planar configuration.

Figure 2:
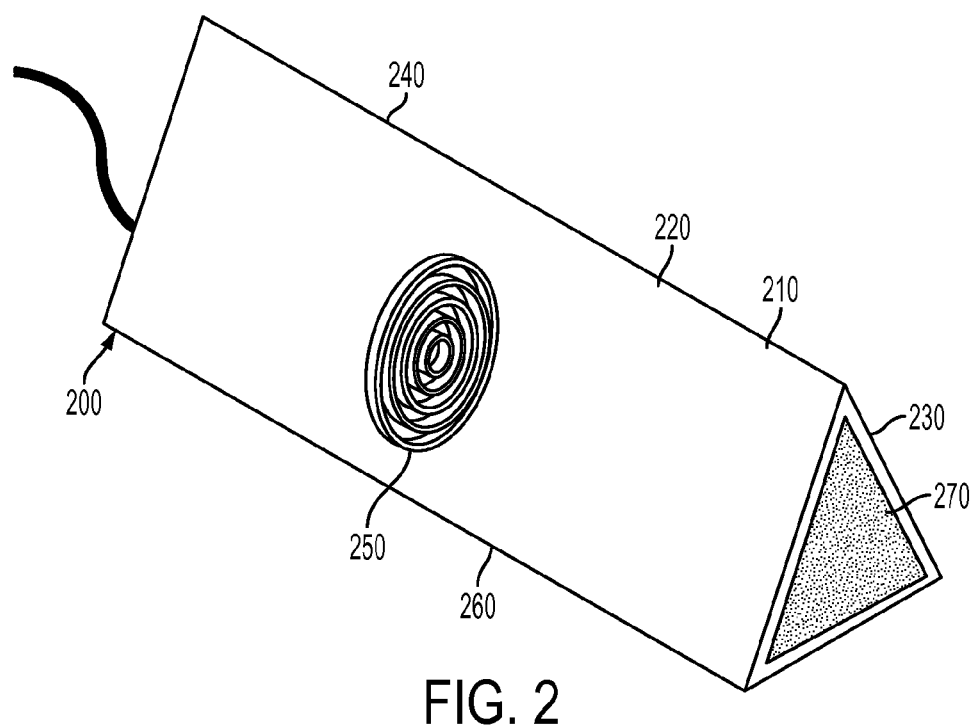
FIG. 2 is a front perspective view of a docking station of the charging system of FIG. 1.

Referring now to FIG. 2, the docking station 200 is shown in accordance with an exemplary embodiment of the present invention. The docking station 200 may include a housing 210. In an exemplary embodiment, the housing 210 may be shaped liked an elongated prism. The housing 210 may include a first docking surface 220 and a second docking surface 230 which may be non-planar to the first docking surface 220. In some embodiments, the docking station 200 may include a base 260 so that the first docking surface 220 and the second docking surface 230 may form a triangular structure with the base 260 when viewed from an end. The first docking surface 220 may intersect with the second docking surface 230 at an apex edge 240. The docking station 200 may include one or more transmission source(s) 250 configured to wirelessly provide an electrical charge to the multi-display portable device 300 (FIG. 1). In an exemplary embodiment, the transmission source 250 may be an inductive coil. It will be understood that the transmission source 250 typically resides internally within the housing 210 and the depiction of the transmission source 250 shown in FIG. 2 is for illustration purposes only. In some embodiments, the docking station 200 may provide auxiliary functions that may work in conjunction with the multi-display portable device 300 (FIG. 1). For example, the docking station 200 may include one or more speakers 270. In some embodiments, the speaker(s) 270 may be on the ends of the docking station 200 and may play audio transmitted from the multi-display portable device 300 (FIG. 1).

Figure 3:
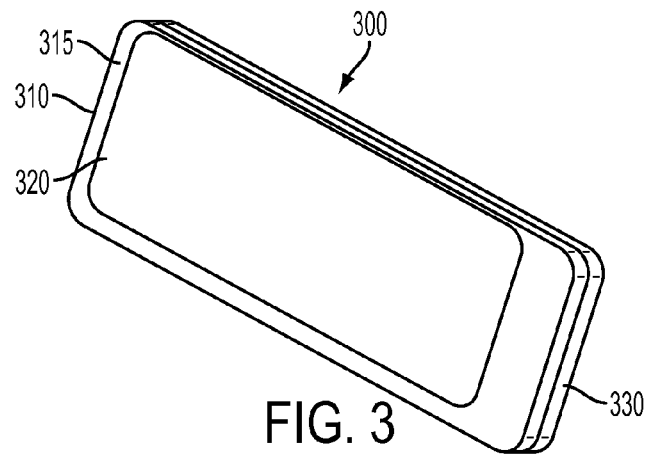
FIG. 3 is a perspective front view of a multi-display portable device of the charging system of FIG. 1 shown in a closed configuration with visible displays.
Figure 4:
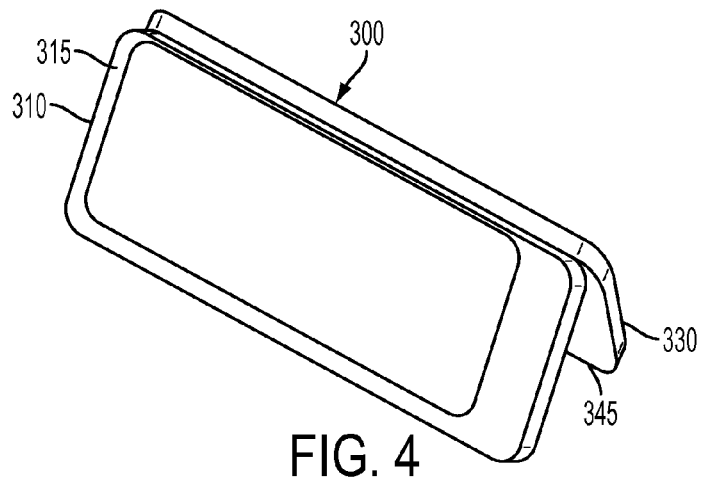
FIG. 4 is a front perspective view of the multi-display portable device of the charging system of FIG. 1 shown in a partially open or tented configuration with visible displays.
Figure 5:
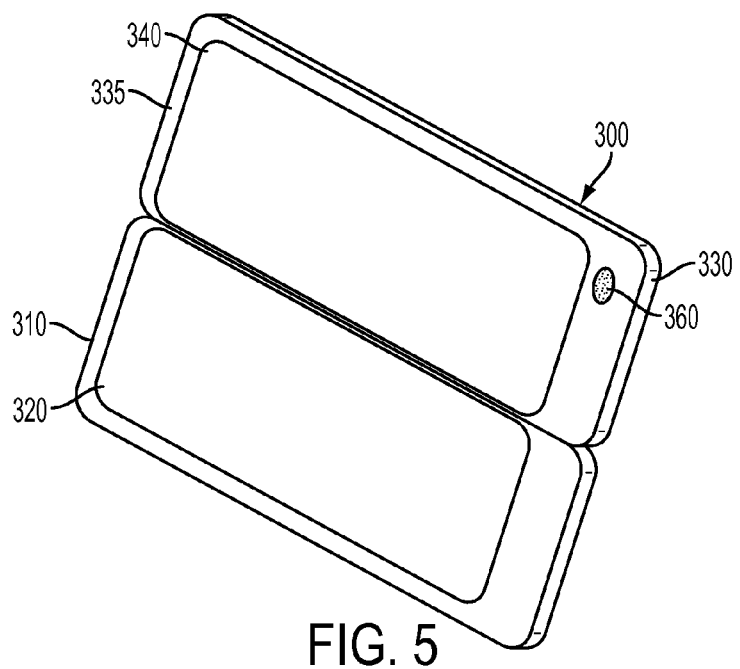
FIG. 5 is a front perspective view of the multi-display portable device of the charging system of FIG. 1 shown in an open planar configuration.

Referring now to FIGS. 3-7, the multi-display portable device 300 is shown in various configurations. The multi-display portable device 300 may generally be an electronic device with display functionality. The multi-display portable device 300 may in general include a first device segment 310 pivotally coupled to a second device segment 330. In general, the first device segment 310 and the second device segment 330 may be movable relative to each other allowing the multi-display portable device 300 to be viewed under various modes of operation. The first device segment 310 may include a display side 315 and a rear side 325. The display side 315 may include a display 320. The second device segment 330 may include a display side 335 (FIG. 5) and a rear side 345 (FIG. 4). The display side 335 may include a display 340 (FIG. 5). In some embodiments, the display 320 may operate independently of the display 340 so that the display 320 may show a different output than the display 340.

As shown in FIG. 3, the multi-display portable device 300 may be configurable so that the display 320 is back to back with the display 340 (as shown in FIG. 5 but not visible in FIG. 3) and each display (320; 340) may face outward away from each other.

As shown in FIG. 4, the first device segment 310 may be pivoted ajar from the second device segment 330 and may be non-planar to one another (for example, in a tented configuration) so that the displays 320; 340 may point upward and away from each other.

As shown in FIG. 5, the first device segment 310 and the second device segment 330 may share the same plane so that the displays 320; 340 may point in the same direction. Some embodiments of the multi-display portable device 300 may include a camera 360. The camera 360 is shown on the second device segment 330 however it will be understood that the camera 360 may be present on either the first device segment 310 or the second device segment 330.

Figure 6:
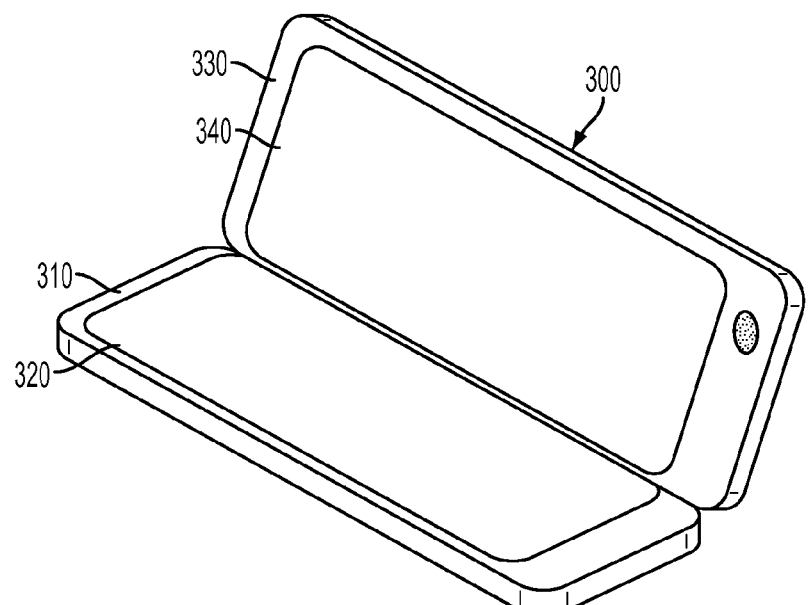
FIG. 6 is a perspective view of the multi-display portable device of the charging system of FIG. 1 shown in an open, clam shell configuration.

As shown in FIG. 6, the first device segment 310 may be moved into an approximate right angle relative to the second device segment 330 so that the first display 320 is substantially perpendicular to the second display 340.

Figure 7:
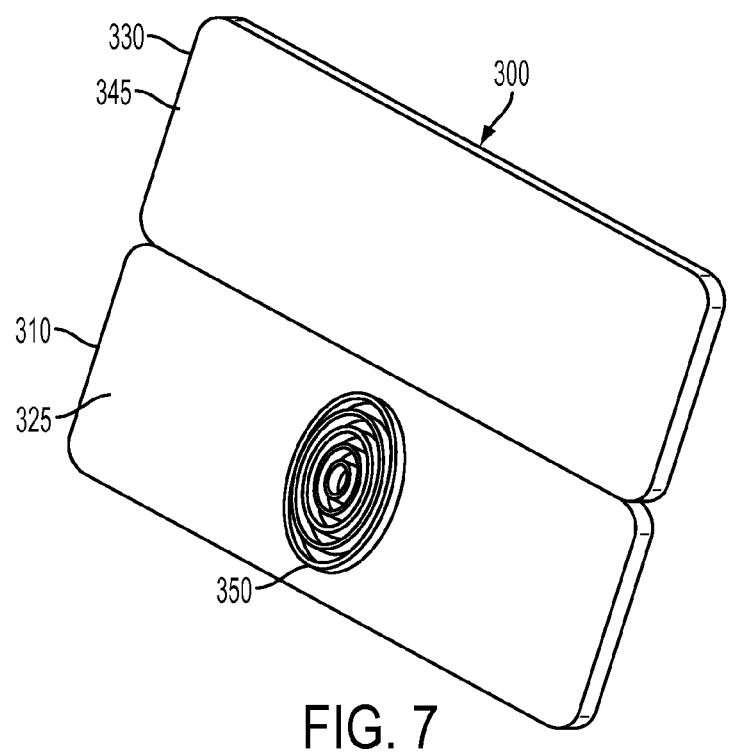
FIG. 7 is a perspective rear view of the multi-display portable device of FIG. 5.

Referring now to FIG. 7, the multi-display portable device 300 is shown from a rear perspective of the configuration shown in FIG. 5. The multi-display portable device 300 may include a charger 350. In an exemplary embodiment, the charger 350 may be on the first device segment 310 or the second device segment 330. It will be understood that the charger 350 typically resides internally in the multi-display portable device 300 and the depiction of the charger 350 shown in FIG. 7 is for illustration purposes only. In an exemplary embodiment, the charger 350 may be a coil configured to receive, for example, an inductive charge from the transmission source 250 (FIG. 2) when the multi-display portable device 300 is docked onto the docking station 200 (FIG. 2).

Figure 8:
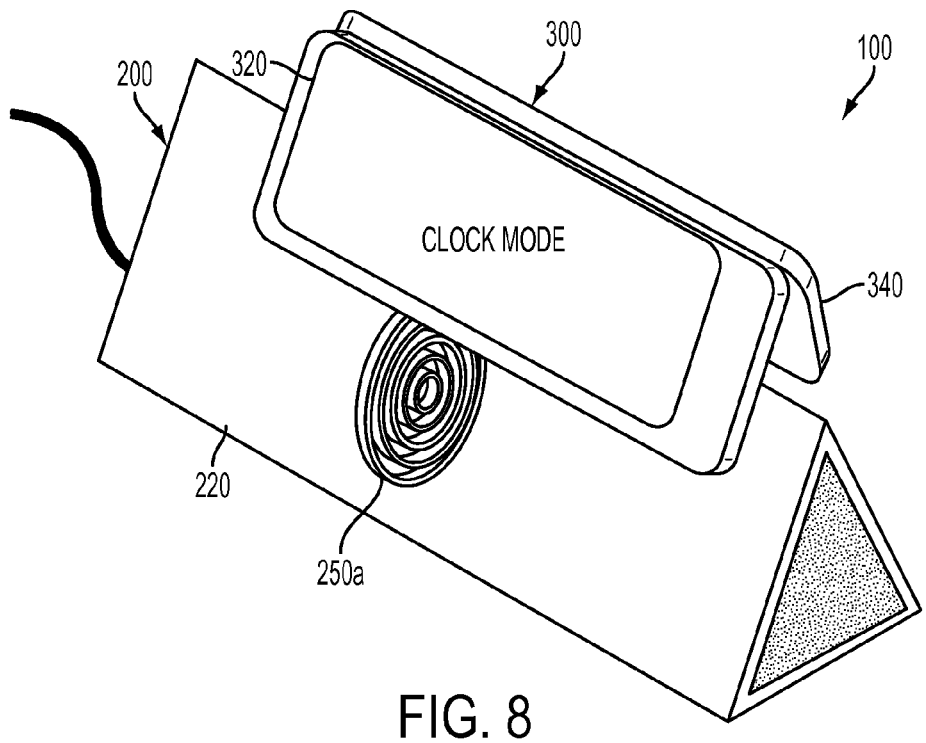
FIG. 8 is a front perspective view of the charging system of FIG. 1 in a first operating mode according to an exemplary embodiment of the present invention.
Figure 9:
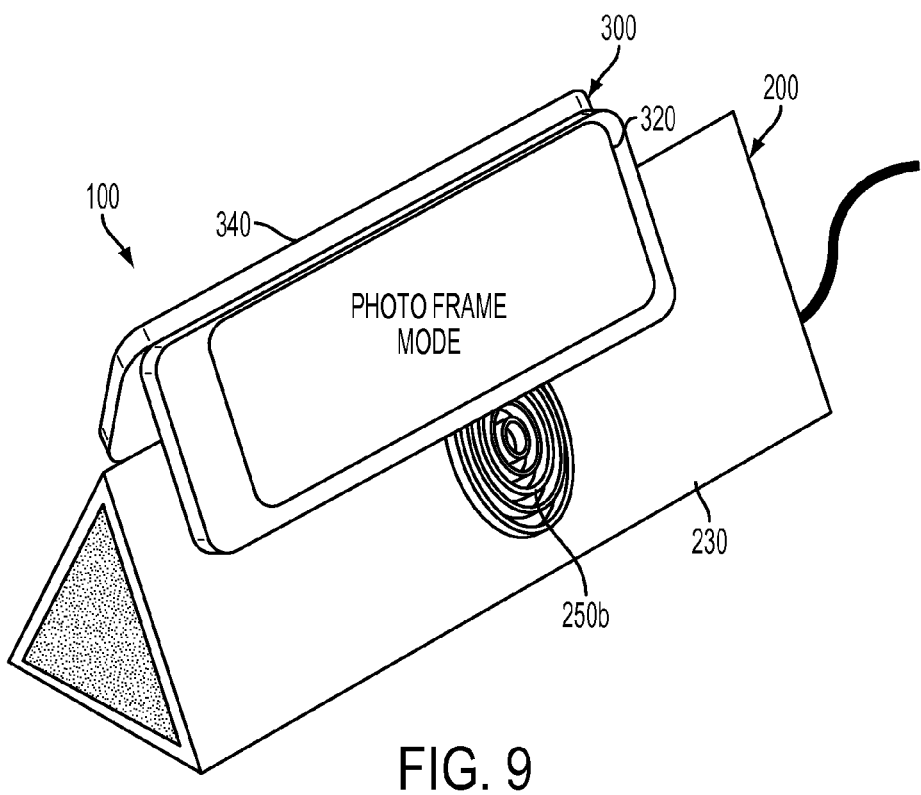
FIG. 9 is a rear perspective view of the charging system of FIG. 1 in a second operating mode according to an exemplary embodiment of the present invention.

Referring now to FIGS. 8 and 9, the charging system 100 may be configured to operate the multi-display portable device 300 in different modes depending on which docking surface (220 or 230) is in charging range of the charger 350. In an exemplary embodiment, the docking station 200 may include a transmission source 250a (FIG. 8) connected to the docking surface 220 and a transmission source 250b (FIG. 9) connected to the docking surface 230. The implementation of two different transmission sources 250 may allow the multi-display portable device 300 to be charged on the docking station 200 regardless of which side of the docking station 200 is in range of the charger 350. The use of non-planar docking surfaces 220 and 230 may be particularly helpful in holding the multi-display portable device 300 when the device 300 is in a tented configuration (for example, as shown in FIG. 4). In instances where the multi-display portable device 300 is in a tented configuration, the user may benefit from the multi-display portable device 300 providing different output from both displays (320; 340). One of the transmission sources 250 may correspond to a primary function being output on one of the displays (320; 340) while the other transmission source 250 may correspond to a secondary function output on the other of the displays (320; 340). For example, in some embodiments, if the multi-display portable device 300 is docked to receive charging from the transmission source 250a (FIG. 8), then the multi-display portable device 300 may be configured to operate in for example, a clock mode showing the current time. The time may be shown on display 320 while the display 340 (hidden from view in FIG. 8) may display a different output than the time or may also display the time. In some embodiments, if the multi-display portable device 300 is docked to receive charging from the transmission source 250b (FIG. 9), then the multi-display portable device 300 may be configured to operate in for example, a photo display mode showing video files (for example, photographs or movies) stored in the multi-display portable device 300 on the display 320. The display 340 (hidden from view in FIG. 9) may display a different output than video files or may also show video files. It will be understood however that other modes of operation which may be pre-programmed into the multi-display portable device 300 may be used (for example, as a music player or as an audio alarm using the speakers 270 (FIG. 2)). A user may appreciate that the multi-display portable device 300 may continue to provide multiple useful functions while charging.

Figure 10:
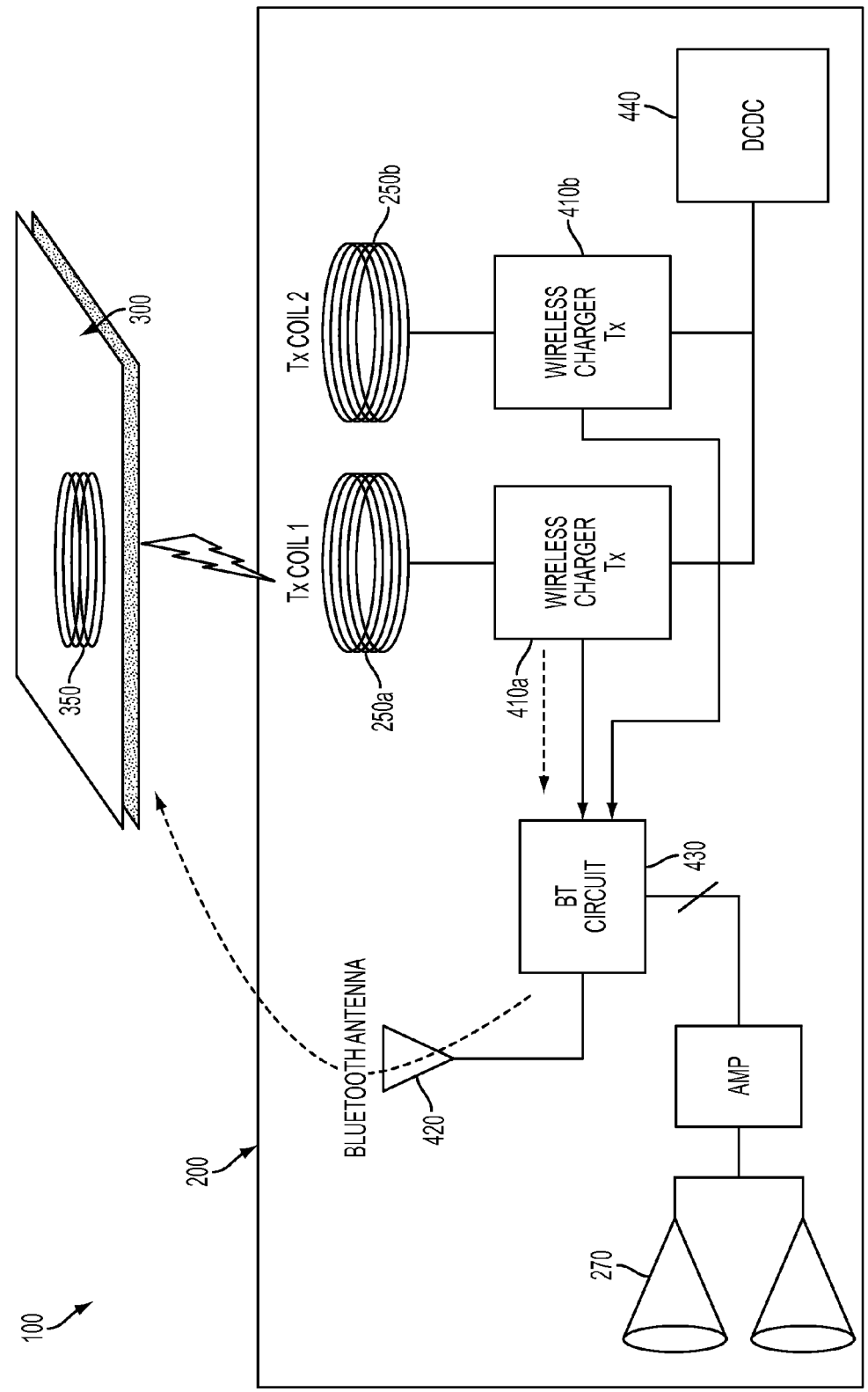
FIG. 10 is a block diagram of the charging system of FIG. 1 according to an exemplary embodiment of the present invention.

Referring now to FIG. 10, the wireless charging system 100 is shown with further internal components of the docking station 200 in accordance with an exemplary embodiment of the present invention. Wireless charging transmitters 410a and 410b may control charging from the transmission sources 250a and 250b respectively. The docking station 200 may use a polling technique to determine whether the multi-display portable device 300 is in charging range of either of the transmission sources 250a or 250b. In an exemplary embodiment, a transceiver 420 may transmit a polling signal. In some embodiments, the transceiver 420 may be a Bluetooth® device. A control circuit 430 may control the frequency of polling transmissions and the condition for determining a successful detection of the multi-display portable device 300. In an exemplary embodiment, the control circuit 430 may determine whether the charger 350 is closer to either the transmission source 250a or the transmission source 250b.

The control circuit 430 may activate the wireless charging transmitters (410a and 410b) to provide power from a power source 440 to the transmission sources (250a or 250b) that is in charging range of the charger 350. The control circuit 430 may also be configured to provide auxiliary functions of the multi-display portable device 300 through the docking station 200. For example, in some embodiments, audio files from the multi-display portable device 300 may be received at the control circuit 430 and played via the speakers 270.

Figure 11:
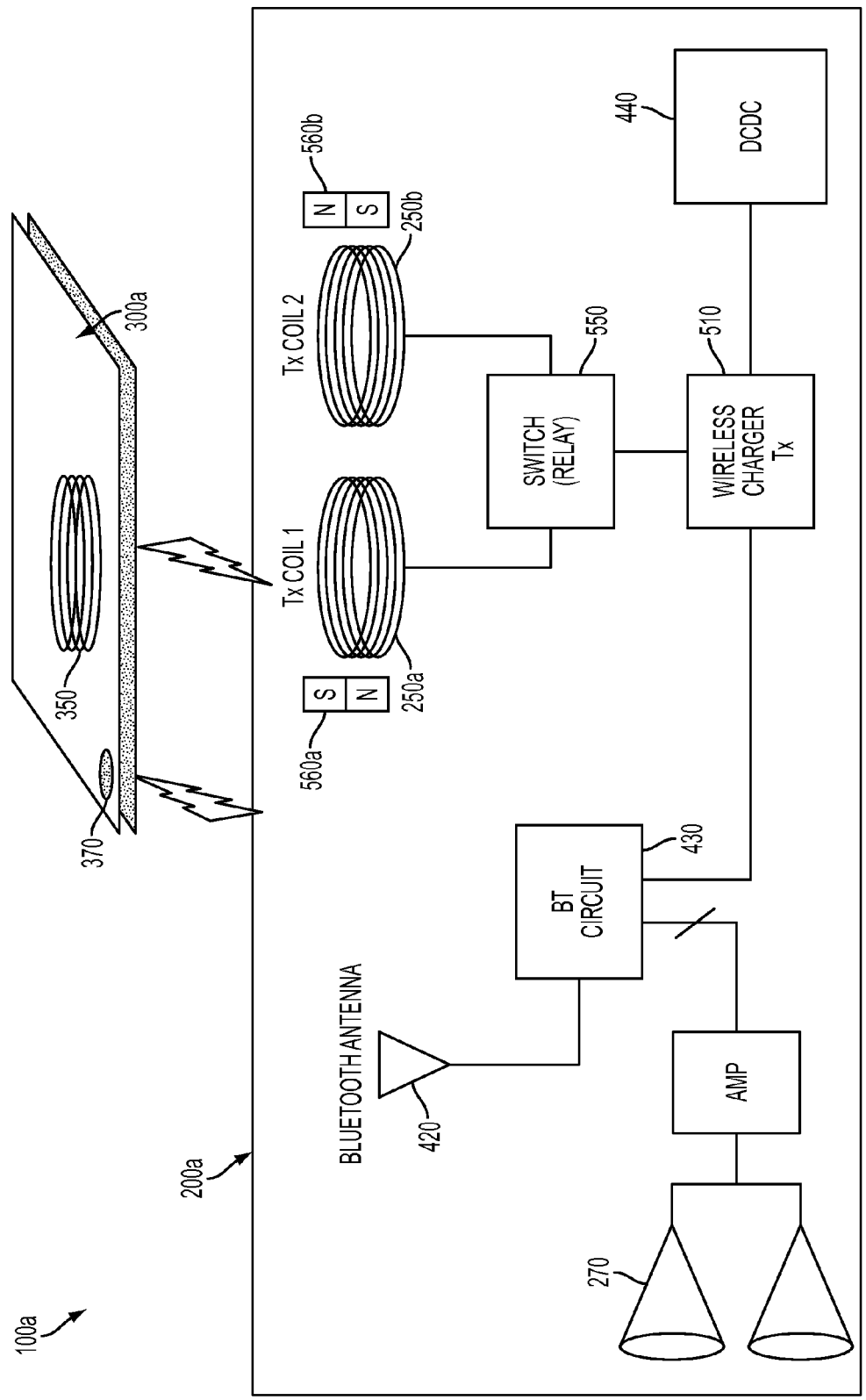
FIG. 11 is a block diagram of the charging system of FIG. 1 according to another exemplary embodiment of the present invention.

Referring now to FIG. 11, a wireless charging system 100a is shown with further internal components of the docking station 200a in accordance with another exemplary embodiment of the present invention. The docking station 200a is similar to the docking station 200 of FIG. 10 except that a single wireless charging transmitter 510 may be used along with a switch 550 controlling transmission of power from the power source 440 to the transmission sources (250a or 250b). Also, in an exemplary embodiment, a transmission source identifier 560a and 560b (referred to generally as transmission source identifiers 560) may be adjacent respective transmission sources 250a and 250b. The transmission source identifiers 560 may be for example, a mechanical signal source such as a magnet. In an exemplary embodiment, the multi-display portable device 300 may include a sensor 370. In embodiments that use magnets as the transmission source identifiers 560, the sensor 370 may be for example a Hall effect sensor. The magnets may be oriented so that the transmission source identifier 560a has a different pole orientation than the transmission source identifier 560b. Thus, when the multi-display portable device 300 is docked onto the docking station 200a, the sensor 370 may detect the presence of the transmission source identifier 560. The multi-display portable device 300 may signal the transceiver 420 which of the two transmission source identifiers 560 is in charging range of the multi-display portable device 300 thus activating the control circuit 430 to provide a signal to the wireless charging transmitter 510 to begin transmitting power through the transmission source 250 whose transmission source identifier 560 was detected. In addition, the control circuit 430 may signal the multi-display portable device 300 to operate under a mode of operation associated with the side of the docking station 200a corresponding to the detected transmission source identifier 560.

It should be understood, of course, that the foregoing relates to exemplary embodiments of the invention and that modifications may be made without departing from the spirit and scope of the invention as set forth in the following claims.

What is claimed is:

1. A docking station for charging up a multi-display portable device, the docking station comprising:
   one or more docking surfaces configured to receive the multi-display portable device;
   a power source; and
   at least two transmission sources, coupled to the power source, and at least one of said at least two transmission sources is positioned to cause transmitting electrical charge via a wireless coupling to a charger of the multi-display portable device as the multi-display portable device is docked on the docking station.

2. The docking station of claim 1, wherein the at least two transmission sources are attached to different docking surfaces.

3. The docking station of claim 1, wherein the at least two transmission sources are on a respective one of the docking surfaces on different planes of the docking station.

4. The docking station of claim 1, including a first docking surface connected to a second docking surface at an apex.

5. The docking station of claim 4, wherein a first of the at least two transmission sources is coupled to the first docking surface and a second of the least two transmission sources is coupled to the second docking surface.

6. The docking station of claim 5, wherein the first of the at least two transmission sources is positioned to cause transmitting electrical charge via a wireless coupling to the charger while the multi-display portable device is docked in a first mode of operation and the second of the at least two transmission sources is positioned to cause transmitting electrical charge via a wireless coupling to the charger while the multi-display portable device is docked in a second mode of operation.

7. The docking station of claim 1, further comprising a transceiver configured to send a polling signal to the charger and detect a presence of the charger on the docking station.

8. The docking station of claim 7, wherein the transceiver is configured to detect whether the charger is on a first surface of the docking station or on a second surface of the docking station.

9. A docking station for charging up a multi-display portable device, the docking station comprising:
   one or more docking surfaces configured to receive the multi-display portable device for docking;
   a power source;
   a first transmission source and a second transmission source, coupled to the power source, and positioned to cause transmitting electrical charge via a wireless coupling to a charger of the multi-display portable device as the multi-display portable device is docked on the docking station; and
   a circuit configured to detect whether the charger is in charging range of the first transmission source or the second transmission source.

10. The docking station of claim 9, wherein the first transmission source is coupled to a first docking surface of the docking station and the second transmission source is coupled to a second docking surface of the docking station.

11. The docking station of claim 10, wherein the first docking surface and the second docking surface are configured to receive the multi-display portable device in a non-planar configuration.

12. The docking station of claim 10, wherein the first docking surface and the second docking surface are non-planar to each other.

13. The docking station of claim 9, wherein the circuit is configured to toggle the multi-display portable device to operate:
   in a first mode in response to detection of the charger being in range of the first transmission source, and
   in a second mode in response to detection of the charger being in range of the second transmission source.

14. A wireless charging system, comprising:
   a multi-display portable device, including:
      a first device segment,
      a first display attached to the first device segment,
      a second device segment pivotally coupled to the first device segment,
      a second display attached to the second device segment, and
      a charger attached to the first device segment; and
   a docking station configured to receive the multi-display portable device for charging, the docking station including:
      one or more docking surfaces configured to receive the multi-display portable device for docking;
      a power source;

a first transmission source and a second transmission source, coupled to the power source, and positioned to cause transmitting electrical charge via a wireless coupling to a charger of the multi-display portable device as the multi-display portable device is docked on the docking station.

15. The system of claim 14, wherein the multi-display portable device is configured to allow the first display to display in a non-planar direction relative to the second display.

16. The system of claim 14, wherein the multi-display portable device further comprises a sensor configured to detect whether the charger is in charging range of either the first transmission source and the second transmission source.

17. The system of claim 16, wherein the docking station further comprises a circuit configured to toggle the multi-display portable device to operate:

in a first mode of operation in response to detection of the charger being in range of the first transmission source, and in a second mode of operation in response to detection of the charger being in range of the second transmission source.

18. The system of claim 17, wherein the first display displays an indication of the first mode of operation in response to the circuit toggling the multi-display portable device to operate in the first mode.

19. The system of claim 18, wherein the second display displays an indication of the second mode of operation in response to the circuit toggling the multi-display portable device to operate in the second mode.

20. The system of claim 14, wherein the first transmission source and the second transmission source charge the charger using inductive charging.

\* \* \* \* \*